United States Patent
Bischofberger et al.

[11] Patent Number: 5,511,521
[45] Date of Patent: Apr. 30, 1996

[54] LIGHT-ALLOY PISTON WITH A COMBUSTION BOWL

[75] Inventors: Ulrich Bischofberger, Esslingen; Dieter Müller-Schwelling, Fellbach, both of Germany

[73] Assignee: Mahle GmbH, Stuttgart, Germany

[21] Appl. No.: 341,660

[22] Filed: Nov. 17, 1994

[30] Foreign Application Priority Data

Nov. 26, 1993 [DE] Germany .......................... 43 40 267.4

[51] Int. Cl.⁶ ................................ F16J 1/01; B23P 15/10
[52] U.S. Cl. ........................................................ 123/193.6
[58] Field of Search ............................... 123/193.6, 657, 123/668, 270

[56] References Cited

U.S. PATENT DOCUMENTS

| | | | |
|---|---|---|---|
| 4,140,096 | 2/1979 | Dunn et al. | 123/193.6 |
| 4,334,507 | 6/1982 | Köhnert et al. | 123/193.6 |
| 4,651,631 | 3/1987 | Avezou | 123/193.6 |
| 4,658,706 | 4/1987 | Sander et al. | 123/193.6 |
| 4,662,326 | 5/1987 | Köhnert | 123/193.6 |

FOREIGN PATENT DOCUMENTS

| | | | |
|---|---|---|---|
| 1032600 | 6/1958 | Germany . | |
| 2938018A1 | 4/1981 | Germany . | |
| 3119113C2 | 3/1984 | Germany . | |
| 3430056C1 | 1/1986 | Germany . | |
| 3430056C | 9/1988 | Germany . | |
| 3932563 | 4/1991 | Germany | 29/888.04 |
| 59-108849 | 6/1984 | Japan | 123/193.6 |
| 62-10457 | 1/1987 | Japan | 123/193.6 |
| 63-255550 | 10/1988 | Japan | 123/193.6 |
| 3-105048 | 5/1991 | Japan | 123/193.6 |

*Primary Examiner*—David A. Okonsky
*Attorney, Agent, or Firm*—Collard & Roe

[57] ABSTRACT

A ring for protecting the edge of a combustion bowl disposed within a top surface of a light-alloy piston for a diesel engine. The ring is made of fine-grain carbon and serves as bowl edge armor. The ring is galvanically coated before being bonded to the remainder of the piston. The exterior surface of the bowl edge armor is coated with an antioxidation compound.

10 Claims, 1 Drawing Sheet

LIGHT-ALLOY PISTON WITH A COMBUSTION BOWL

BACKGROUND OF THE INVENTION

1. Field of the Invention

The present invention relates to a light-alloy piston with a combustion bowl provided with fine-grain carbon armoring.

2. The Prior Art

It is known from U.S. Pat. No. 4,334,507 to provide pistons with combustion bowls where the edge of the bowl has armor of sintered, porous chrome-nickel steel. During manufacture of the piston, the porous chrome-nickel steel is infiltrated by the melt which is under pressure.

Furthermore, it is known from DE-PS 34 30 056 to provide the edge of the bowl with an armoring made of $Al_2O_3$ fibers. The fibers are made into a fiber preform. The preform is infiltrated by the melt which is under pressure during manufacture of the piston.

The reason for adding armor is to prevent cracks frequently caused on the edge of the bowl due to stresses caused by temperature changes.

The drawback of infiltrating the Cr-Ni-steel armor with the basic Al-material of the piston is its poor workability, its higher specific weight, and its lower strength as compared to the ceramic-fiber composite material.

The $Al_2O_3$ fibers also have drawbacks in that during manufacture and processing, the ceramic-fiber composite material is subject to stricter environmental protection requirements, and its disposal is difficult because the fibers and the melt cannot be separated from each other. Both processes have the common drawback that the melt has to be acted upon by pressure in order to completely fill the open pores of the armor with the melt.

Thus, the invention is based on providing an armor material for the edge of the bowl, which safely prevents cracking on the edge of the bowl, without having the aforementioned drawbacks.

SUMMARY OF THE INVENTION

It is, therefore, an object of the present invention to overcome the drawbacks of the prior art and to provide a light-alloy piston for a diesel engine where the edges of the combustion bowl are strengthened.

It is a further object of the present invention to provide a piston with bowl edge armor that can be easily manufactured. These and other related objects are achieved according to the invention by a device for protecting the edge of a combustion bowl disposed within a top surface of a light-alloy piston for diesel engine. The device consists of a ring made of fine-grain carbon defining bowl edge armor. The ring may consist also of a plurality of ring segments.

The light-alloy piston is cast around the bowl edge armor under gravitational force. The piston includes an undercut and the bowl edge armor is disposed within the undercut to secure it to the piston.

The invention also relates to a process for manufacturing a light-alloy piston with a combustion bowl for a diesel engine. The process includes the steps of producing a ring of fine-grain carbon and galvanizing the ring to form a metal coating thereon. The ring is dipped into a first metal melt to slightly dissolve the metal coating. The ring is removed from the first metal melt and placed into a form with the metal coating still partially unsolidified. The piston is formed by pouring a second light-alloy metal melt into the form around the galvanized ring to produce a metallic bond between the ring and the second light-alloy metal, wherein the ring defines bowl edge armor for the combustion bowl. At least a surface of the ring exposed to combustion gases may be coated with an antioxidation compound. The ring is galvanically coated, for example with chrome which forms part of the intermetallic bond between the ring and the light-alloy metal.

The design of the piston according to the invention results in the following advantages:

- Only very minor stresses occur on the edge of the bowl due to the low E-modulus of the fine-grain carbon;
- The low coefficient of thermal expansion leads to an excellent resistance to thermal shock;
- In the temperature range above 300° C., fine-grain carbon has mechanical properties superior to the basic piston material;
- Due to reduced heat conduction properties, less heat is introduced into the piston, which reduces the groove and boss temperatures;
- The armor can be incorporated by conventional casting methods, i.e. the melt does not have to be pressurized.
- The great difference in thermal expansion between the piston material and the fine-grain carbon, during cooling of the cast part, causes a shrinking of the piston material onto the fine-grain carbon, producing pressure stresses in the armoring.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 2:
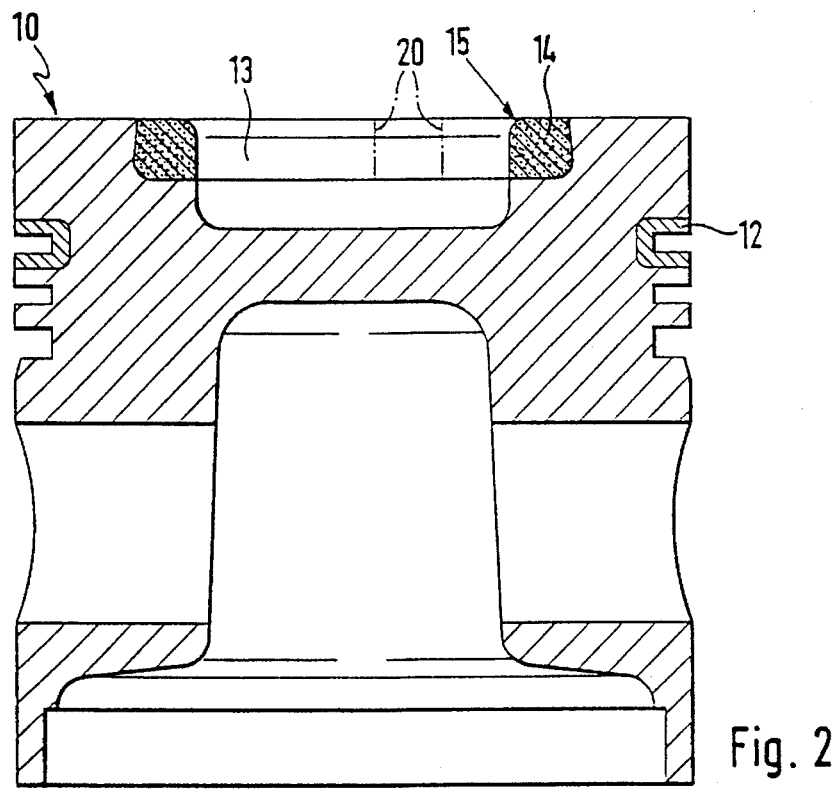
FIG. 2 is a cross-sectional view of the piston taken along the line 2—2 of FIG. 1.
Figure 1:
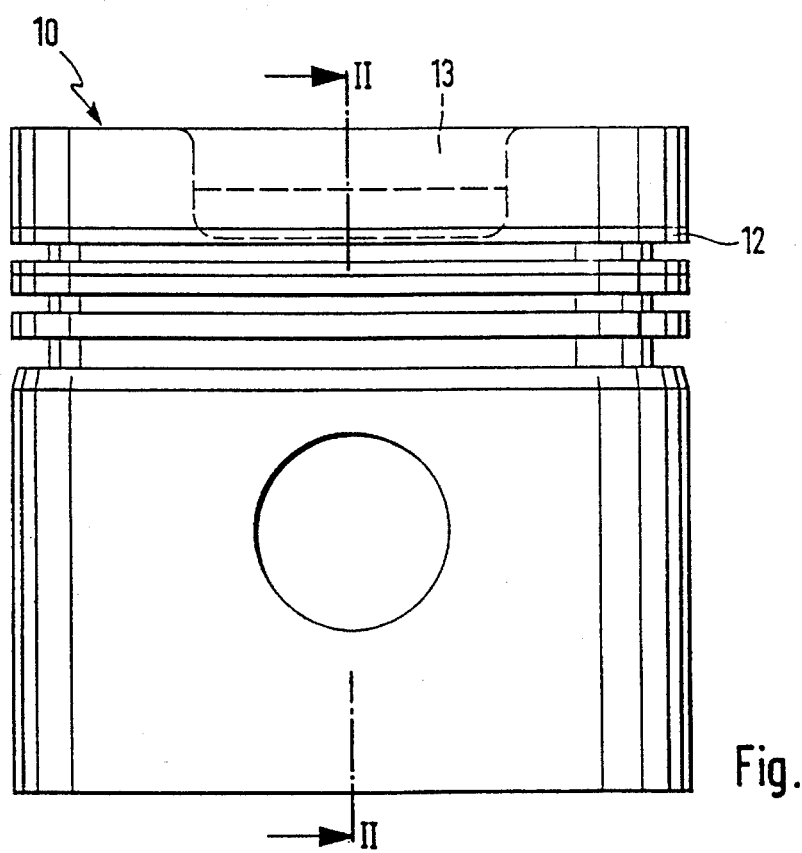
FIG. 1 is a side elevational view of a piston with a combustion bowl.

Referring now to the drawing in detail, and in particular to FIGS. 1 and 2, there is shown a Diesel piston 10 having a ring insert 12 and a combustion bowl 13. Bowl 13 has a bowl edge 15 which is protected against cracking by armor 14 consisting of fine-grain carbon. Armor 14 consists of a ring made of fine-grain carbon or several ring segments separated by division lines 20. Piston 10 is made from an aluminum alloy material, for example, AlSi12CuNiMg (12% Si, 1% Cu, 1% Ni, 1% Mg, balance Al).

Piston 10 is manufactured by liquid pressing with the bottom of the piston being disposed at the bottom. A pressing stamp is driven from above into the melt. The pressure during liquid pressing is 250 bar. In order to prevent the lighter bowl edge armor 14 from floating up during the liquid pressing, it is restrained prior to the liquid pressing.

The restraint consists of radially clamping the inside of armor 14 at three points with a slight press fit. The restraint and armor 14 are preheated and placed into the mold. The piston is cast around the armor 14 and optionally pressurized. The restraint and the clamps are removed by machining the molded piston blank.

Armor 14 is fastened in piston 10 by an undercut. Alternatively, armor 14 can be fastened within piston 10 without an undercut if the shrinking of the piston material onto the armor, which occurs when the latter is poured in, has sufficient strength to fasten the armor when the engine is in operation.

Another possibility of fastening the armor 14 to the basic piston material is to produce a metallic bond. For this purpose, armor 14 is galvanically coated. The coating is subsequently slightly dissolved, analogous to the ALFIN process, in a first metal melt before the armor 14 is placed in the form.

The ALFIN process is a method for joining iron materials to aluminum materials. The iron part is dipped into a first aluminum melt for 2–3 minutes. An $Fe_xAl_y$ layer is formed on the iron part which provides a stable transition between the iron part and the aluminum part. The iron part is then placed into the form and a second aluminum melt is poured around it as quickly as possible to prevent oxide layers from forming.

While several embodiments of the present invention have been shown and described, it is to be understood that many changes and modifications may be made thereunto without departing from the spirit and scope of the invention as defined in the appended claims.

What is claimed is:

1. A device for protecting the edge of a combustion bowl disposed within a top surface of a light-alloy piston for a diesel engine, the device comprising:

a ring consisting of fine graphite defining bowl edge armor.

2. The device of claim 1, wherein said ring comprises a plurality of ring segments.

3. The device of claim 1, wherein said bowl edge armor has an exterior surface exposed to combustion gases; and an antioxidation coating on at least said exterior surface.

4. The device of claim 1, wherein the light-alloy piston is cast around said bowl edge armor.

5. The device of claim 4, wherein the light-alloy piston is cast under gravitational force.

6. The device of claim 4, wherein the light-alloy piston includes an undercut and said bowl edge armor is disposed within the undercut to secure it to the piston.

7. A process for manufacturing a light-alloy piston with a combustion bowl and bowl edge armor for a diesel engine, comprising the steps of:

producing a ring consisting of fine graphite;

galvanizing the ring to form a metal coating thereon;

dipping the ring into a first metal melt to slightly dissolve the metal coating;

removing the ring from the first metal melt and placing the ring into a form with the metal coating still partially unsolidified; and forming the piston by pouring a second light-alloy metal melt around the galvanized ring to produce a metallic bond between the ring and the second light-alloy metal, wherein a combustion bowl is formed in the piston with the ring defining bowl edge armor.

8. The process of claim 7, wherein the ring is galvanically coated with chrome which forms part of the intermetallic bond between the ring and the light-alloy metal.

9. The device according to claim 1, wherein said ring is disposed within a top surface of the light alloy piston and is non-metallic.

10. The device according to claim 1, wherein said ring has a lower E-modulus than the light-alloy of the piston.

* * * * *